Nov. 1, 1960  A. M. LEVINE  2,958,247
PATTERN CONTROL POSITIONING A WORK PIECE AND
A TOOL TURRET FOR AUTOMATIC OPERATION
Filed May 7, 1957  3 Sheets-Sheet 1

Inventor
ARNOLD M. LEVINE
By
Attorney

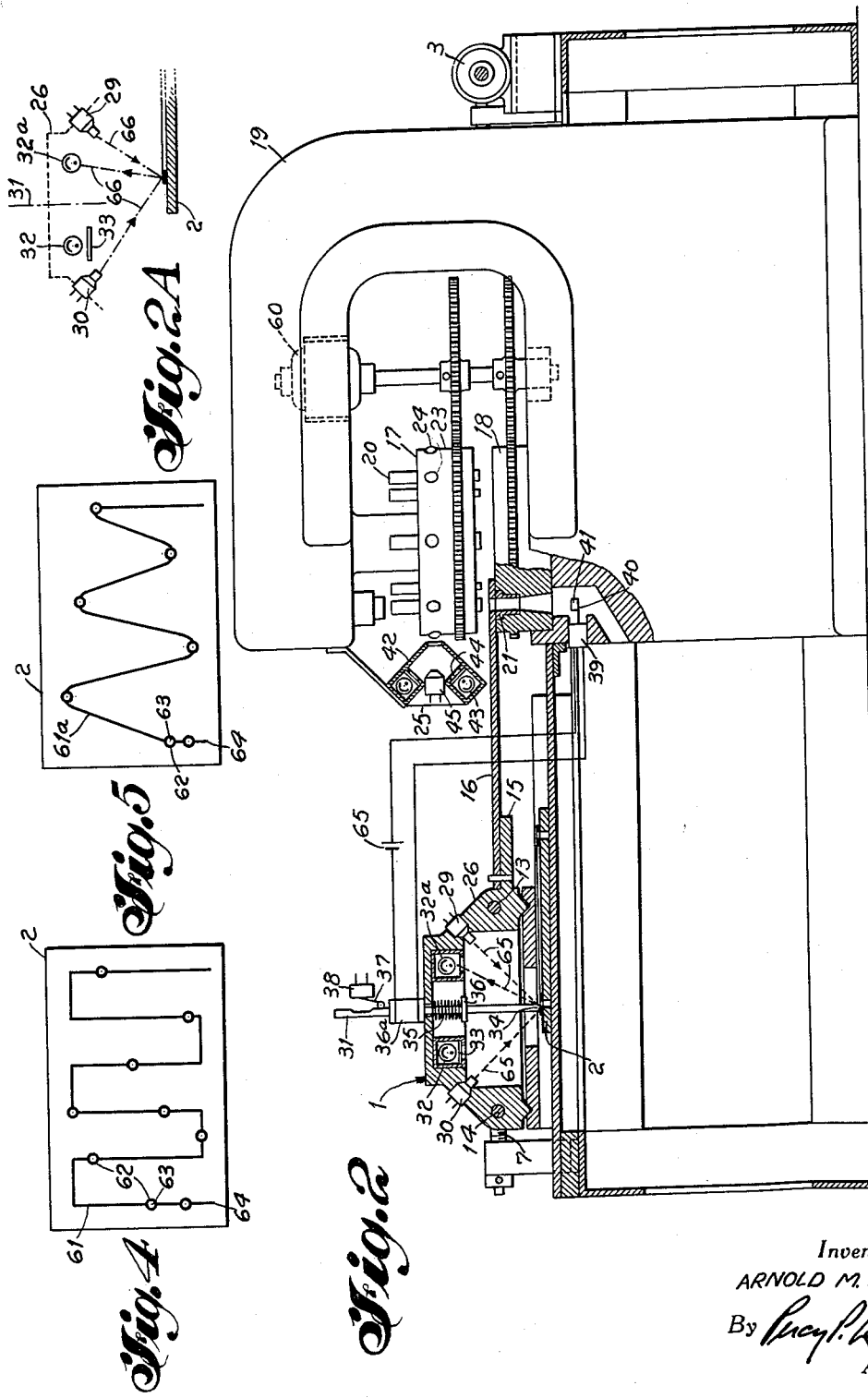

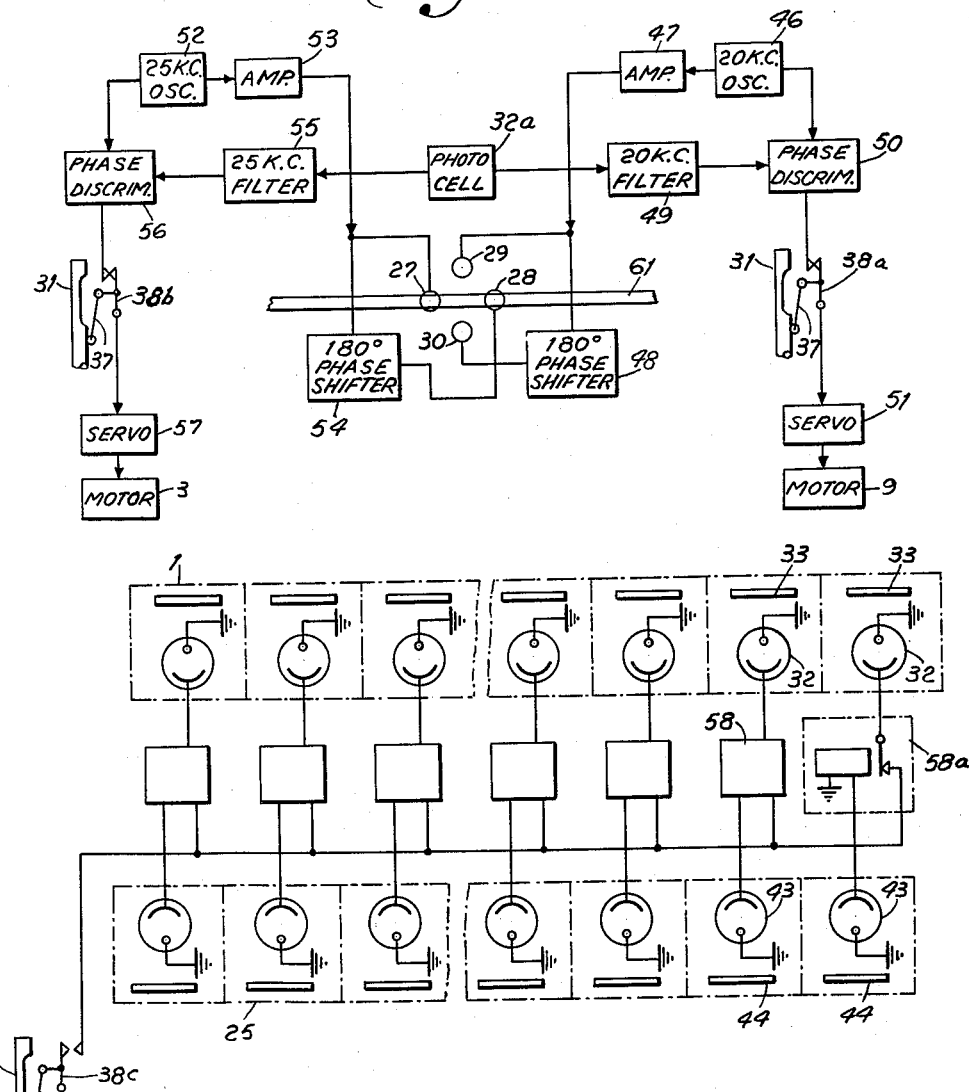

2,958,247

PATTERN CONTROL POSITIONING A WORK PIECE AND A TOOL TURRET FOR AUTOMATIC OPERATION

Arnold M. Levine, Oradell, N.J., assignor to International Telephone and Telegraph Corporation, Nutley, N.J., a corporation of Maryland Filed May 7, 1957, Ser. No. 657,542

19 Claims. (Cl. 83—71)

This invention relates to automatic machine operation control and more particularly to automatic control of a machine in response to information derived from a color coded digitizer, or coded template.

Automatic control of machine operations is becoming increasingly important as a means of reducing production costs and increasing the efficiency of manufacturing operations. This invention offers a means to automatically control a machine where the sequential operations are diverse and still maintain mass production at low cost.

It is an object of this invention to provide an apparatus to automatically control the machine which performs diversified operations on multiple copies of the same work material.

A further object is to provide an apparatus to automatically control a turret type punch press which holes of varying diameters and shapes in substantially flat material.

A feature of this invention is the use of a machine having an upper member and a lower member, at least the upper member being rotatable, and adapted to receive work material therebetween, a template carrying a color code defining the location and type of operation to be performed at specific points on the work material, a corresponding color code carried on the surface of the upper member and means to correlate the relative positions of the upper members and the work material in accordance with selected code information on the template.

Another feature is the provision of a first scanning head adapted to move across the surface of the template over a predetermined path and during this movement cause the work material to be moved correspondingly between the upper and lower members of the machine. A second scanning head is provided to scan the color code on the surface of the upper member to correlate the positioning of the upper member in accordance with scanned code information by the first scanning head.

The above-mentioned and other features and objects of this invention will become more apparent by reference to the following description taken in conjunction with the accompanying drawings, in which:

Fig. 2 is a side elevation view of the apparatus of Fig. 1 including some elements of the circuitry of this embodiment;

Fig. 2a is another view of a portion of Fig. 2, showing the scanning head deviating from the predetermined path.

Fig. 3 is a block diagram of the scanning head guidance elements of the circuitry of this invention;

Fig. 3a is a block diagram of the circuitry which controls the operation of the turret punch press.

Fig. 4 is a plan view of the template showing one form of tracking path;

Fig. 5 is a plan view of the template showing another form of tracking path.

Figure 1:
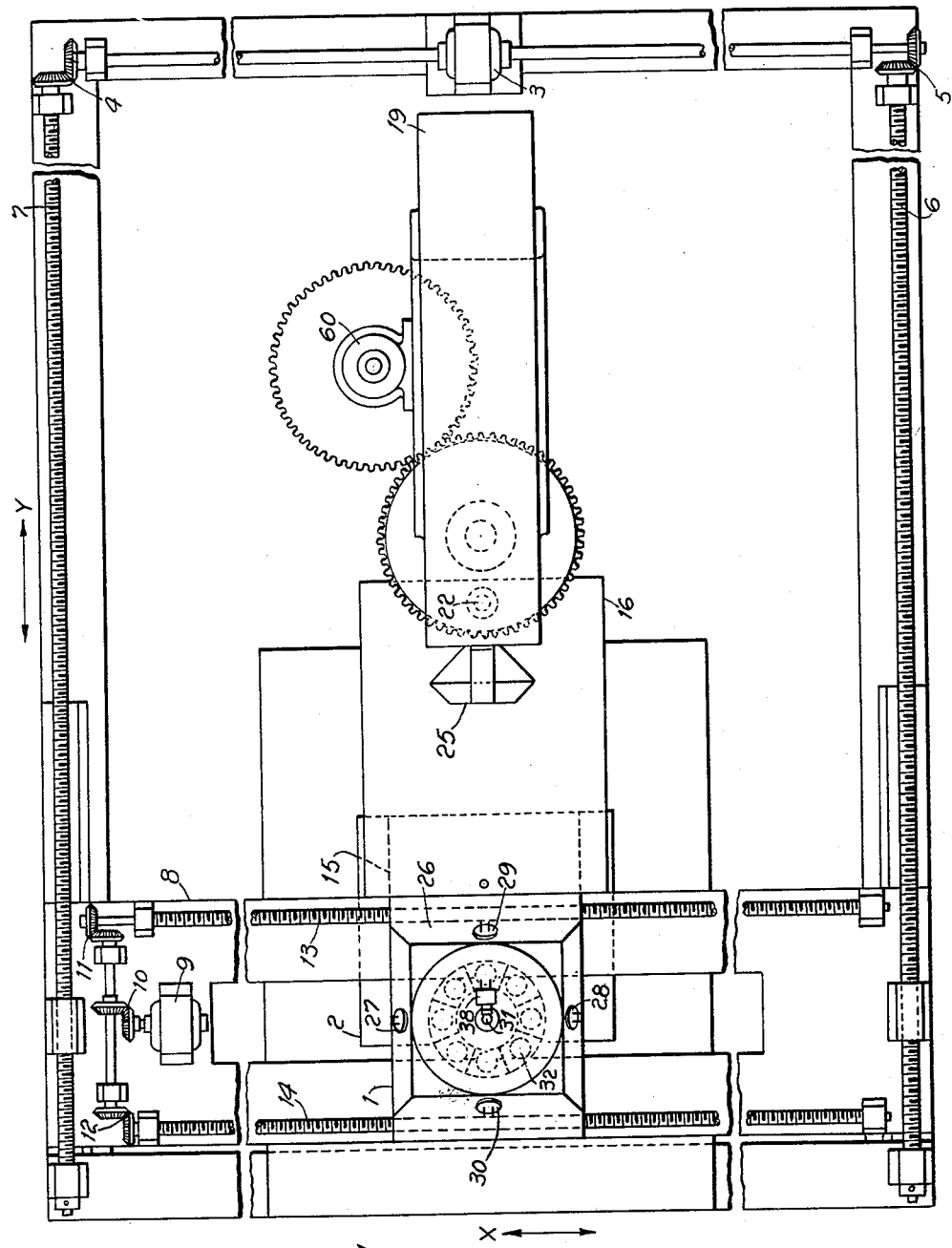
Fig. 1 is a plan view of the apparatus of an embodiment of this invention.

Referring now to Figs. 1, 2 and 5, there is shown an embodiment of this invention for automatically punching holes of different diameters and shapes in different locations on substantially flat material. A two coordinate servo system is shown for moving a scanning head 1 along a predetermined path across a template 2. The movement of the head 1 in the Y coordinate is transmitted via a first servo motor 3 bevel gears 4 and 5, screws 6 and 7 to a carriage 8 which supports the second servo motor 9. As the support carriage 8 is made to undergo its transitory movement in response to the first servo position information, the second servo motor 9 is moved along the Y coordinate axis. The second servo motor 9 is fixedly mounted to the carriage 8 and drives bevel gears 10, 11, 12, and screws 13 and 14, thereby moving the scanning head 1 along the X coordinate axis in response to information transmitted to the second servo motor 9. The scanning head 1 moves in unison with the carriage 8 along the Y axis. A shelf-like portion 15 of the scanning head 1 holds the work material 16 so that the material 16 will move in unison with the scanning head 1 as the scanning head 1 travels over the template 2. The work material 16 is thus moved between a punch turret 17 and a die turret 18 of a turret punch press 19 such as is well known to those familiar with the art. Punch turret 17 contains a number of punches 20 which are located on the periphery thereof. These punches are of different sizes and shapes and will punch differently configured holes as may be desired. The die turret 18 contains dies 21 which match the punches 20 of the punch turret 17. The punch turret 17 and the die turret 18 rotate in unison and are stopped to perform the punching operation at position 22. Around the cylindrical surface 23 of the punch turret 17 are painted dots 24 of different colors, each of which represent a specific punch and die which is located adjacent the color dot 24. A second scanning head 25 is disposed adjacent the color coded surface 23 and position 22 and radially of the punch turret 17.

The scanning head 1 comprises a housing 26 which contains four lamps 27, 28, 29 and 30 of the ordinary variety used for lighting purposes, spaced 90 degrees apart and equidistant from a center pin 31. Circularly spaced about the center of the housing 26 are a plurality of photocells 32 in front of which are located color filters 33. The number of filters and photocells correspond to the number of punches and dies in the punch turret 17 and the die turret 18 plus an additional photocell 32a which is not covered by a filter, the reason for which will become clear later on. The pin 31 is vertically movable within the housing 26. The protruding end 34 of the pin 31 has a rounded end for smooth movement over the template 2. A coil spring 35 is positioned around the pin 31 between the inner surface of the housing 26 and a flange 36 of pin 31. The spring 35 exerts sufficient force on pin 31 to keep pin 31 in contact with the surface of the template 2. A solenoid coil 36a surrounds the pin 31, which is made of magnetizable material. The lever arm 37 of a snap action switch 38 is disposed against the side of the pin 31. Switch 38 (Figs. 2, 3 and 3a) contains three sections 38a and 38b which are single pole, single throw switches normally closed and 38c which is a single throw, single pole section normally open. A second snap action switch 39 which is a single pole, single throw switch normally open is disposed underneath the die turret 18 with its lever arm 40 so positioned that it will receive thereon a slug 41 which is punched out of the work material 16. The second scanning head 25 consists of a housing 42 which contains a plurality of photocells 43 in front of which are disposed color filters 44, all circularly disposed about the center of the housing 42. In the center of the housing 42 is a lamp 45 similar to the lamp 27 of the scanning head 1.

With reference to Fig. 3, a 20 kc. oscillator 46 is coupled to an amplifier 47 the output of which is connected to the lamp 29 and a 180-degree phase shifter 48. The output of the phase shifter 48 is fed to the lamp 30 which is diametrically opposite lamp 29. The photocell 32a (Figs. 2 and 3) which is without any color filter, is coupled to a 20 kc. filter 49, the output of which is fed to a phase discriminator 50. The output of the 20 kc. oscillator 46 is also connected to the phase discriminator 50. Switch 38a couples the phase discriminator to a servo 51, the output of which energizes the motor 9. A 25 kc. oscillator 52 is coupled to an amplifier 53 whose output is fed to lamp 27 and a second 180-degree phase shifter 54 whose output is fed to lamp 28 diametrically opposite 27. Photocell 32a is also coupled to a 25 kc. filter 55, the output of which is connected to a phase discriminator 56 as is the output of the 25 kc. oscillator 52. Switch 38b couples servo 57 to phase discriminator 56 and the output of servo 57 energizes the motor 3.

The photocells 32 located in the scanning head 1 are screened by the color filters 33 and are connected to relays 58, as shown in Fig. 3a. The photocells 43 located in the scanning head 25 all of which are screened by the color filters 44 are correspondingly connected to the relays 58 which are all single pole, single throw normally closed relays. That is, for example, if the photocell 32 of scanning head 1 whose filter is red is connected to relay 58a, then the photocell 43 of the scanning head 25 whose filter is red is also connected to the relay 58a. The output of all relays 58 are connected to a common line which goes to switch 38c. The other end of switch 38c is connected to servo 59 which energizes the turret motor 60.

Fig. 4 shows the path 61 to be followed by the scanning head 1 across the template 2, which follows a strictly coordinate route along the X and Y axes from one hole position to another. In Fig. 5 the path 61a is directly traced between the hole positions. The paths 61 and 61a are white lines. Rings 62 surrounding the holes 63 in the template 2 carry different colors according to the size and/or shape of the holes to be punched, and identical color code spots 24 are provided on the punch turret adjacent the corresponding punches. It is to be understood that the color rings 62 are given by way of example only and may be of any other shape or configuration or dots as may be required. When the pin 31 is positioned in the hole 63 within the confines of the color ring 62, the turrets 17 and 18 will rotate until the correct punch called for by the color ring is brought to position 22. It is to be further understood that the hole 63 is given by way of example and may be replaced by any obstacle located on the path that will so position the pin within the confines of color ring 62.

The operational sequence that is followed in automatically punching the holes in the work material 16 will now be described. Material 16 is fastened to the shelf 15 and supported on the die turret 18 beneath the punch turret 17. The scanning head 1 is placed in position at the start 64 of the path 61, and the servo motors 3 and 9 and the lamps 27, 28, 29, 30 and 45 are switched on. The scanning head 1 proceeds along the path 61 with the pin end 34 contacting the path 61. The 25 kc. voltage generated by the oscillator 52 energizes lamps 27 and 28 and the 20 kc. voltage generated by oscillator 46 energizes lamps 29 and 30. The voltage on lamp 28 is 180 degrees out of phase with the voltage on lamp 27, and the voltage on lamp 29 is 180 degrees out of phase with the voltage on lamp 30. As shown in Fig. 2, the light emitted from the lamps 29 and 30 are directed at the path 61 and reflected back to the photocell 32a which has no filter, as shown by the broken lines 65. So long as the pin 31 is directly on the path 61, the lengths of the light paths are equal, and being opposite in phase, there is a null voltage. Therefore, the photocell 32a is not actuated and no signal is transmitted by it. If, however, the pin 31 deviates from the path 61, then one light path becomes longer than the other as shown by the dot-dash lines 66 in Fig. 2a, and a phase difference voltage will appear at the photocell 32a. This signal is passed through the 20 kc. filter and is compared with the reference 20 kc. voltage generated by the oscillator 46 to ascertain the phase difference. This error voltage is fed into the servo 51 to alter the rotation of the motor 9 and bring the scanning head 1 back to the path 61. The same tracking procedure is followed by the components of the Y coordinate axis to correct any error in the scanning head when traveling along the Y axis and keep it on the correct path.

When the pin 31 arrives at a hole 63 on the path 61, it will be impelled into the hole 63 by the downward force of the spring 35. As the pin 31 moves down, it actuates the snap action switch 38 which will open the circuit to the motors 3 and 9 thereby stopping the travel of the scanning head 1. The light shining on the path 61 and the color ring 62 will be reflected back to the photocell 32 and 32a. The reflected white light will have no effect on the movement of the scanning head 1 since the motor circuits are open. The reflected color light will pass through only the filter 33 which is of the same color as that particular color ring 62. The light so reflected will impinge on the photocell 32 behind the filter 33 and generate a current which will pass through the relay 58, the switch 38c, which has now been closed, to the servo 59 which will rotate the turret motor 60. As the turrets 17 and 18 rotate, the scanning head 25 will scan the color spots 24 on the punch turret surface 23. Each color so scanned will actuate the photocells 43 which has a color filter 44 carrying the same color. However, these generated currents will have no effect on the turret motor 60, until the color spot 24 which is of the same color as the color ring 62 within which the pin 31 is now positioned, comes within the scrutiny of the scanning head 25. The current generated in the associated photocell 43 will open the relay 58, thus interrupting the circuit to the turret motor 60 and stopping its rotation. The turrets 17 and 18 will now be in position for the punching operation at position 22 which is performed by the mechanism of the turret punch press machine. The slug 41 punched out by the punch 20 of the punch turret 11 will fall through the die 21 on to the lever arm 40 of the switch 39. This will actuate the switch 39 and close the circuit which energizes the solenoid coil 36a by means of energy source 65 and thereby pull the pin 31 out of the hole 63. As the pin 31 moves up, the switch 38 is deactuated, the circuits of motors 3 and 9 close and the scanning head 1 pursues its travel to repeat the process described above. It is to be understood that instead of the snap action switch 39, a time delay switch may be used which will serve to keep the circuits to the motors 3 and 9 open until the punching process is completed.

The coding system described above is also adaptable to an apparatus to control automatically the assembly of components on substantially flat material such as chassis or boards. The upper turret of such an apparatus can be equipped with hoppers containing the components. Each hopper would occupy a position analogous to a punch on the punch turret, and would carry a quantity of a specific component. The template's color coding would indicate the component to be placed on the work material at the coincident place and the hopper would be identified by the appropriate color dot on the turret surface. A time delay switch would be incorporated in the circuit to allow the turret rotation and the template scanning head motors' rotation to cease long enough to permit the placing of the component of the work material for each operation.

While I have described above the principles of my invention in connection with specific apparatus, it is to be clearly understood that this description is made only by way of example and not as a limitation to the scope of my invention as set forth in the objects thereof and in the accompanying claims.

I claim:
1. An apparatus for automatically controlling the operation of a machine having a movable member carrying a plurality of devices adapted to perform operations on work material disposed adjacent thereto, comprising a first code means having prearranged code information to determine the location and types of operations to be performed on said work material, a first scanning head, means coupled to said first scanning head to move said first scanning head relative to the code of information of said first code means, means coupled to said first scanning head to move said work material in accordance with the movement of said first scanning head, means coupled to said first scanning head and responsive to said first code means to stop the movement of said first scanning head and to control the movement of said movable member, a second code means associated with said movable member, a second scanning head adapted to scan said second code means, means coupled to said second scanning head and responsive to said second code means to stop the movement of said movable member at a predetermined location in accordance with the said code information of said first code means for said devices to perform said operations on said work material.

2. An apparatus according to claim 1, wherein the first coding means includes a template having code information thereon, and the means for moving said first scanning head includes means for moving said first scanning head over the area of said template in accordance with a predetermined pattern.

3. An apparatus according to claim 2, wherein the first code means includes a predetermined path interconnecting the code information thereof, and said first scanning head includes means to guide said first scanning head along said path.

4. An apparatus according to claim 3, wherein the guiding means for said first scanning head includes a plurality of lamps adapted to direct light towards said path and a photocell disposed on said first scanning head in a position to receive light reflected from said path and means to move said scanning head over said template along said path according to information derived from said light.

5. An apparatus according to claim 4, wherein the positions of said lamps provide for first and second light paths, a first pair of said lamps being located on an axis at right angles to the axis connecting a second pair of said lamps, said lamps being equidistant from the center of said first scanning head, means to energize said first pair of lamps by a voltage of a first frequency 180 degrees out of phase with each other lamp, means to energize said second pair of lamps by said voltage of a second frequency 180 degrees out of phase with each other lamp, and means to determine the phase difference over said first light path between said voltages of said lamps of said first pair and the phase difference over said second light path between said voltages of said lamps of said second pair during the movement of said first scanning head over said template to control the movement of said first scanning head along said predetermined path.

6. An apparatus according to claim 5, wherein said means to determine the phase differences between the voltages of said lamps of said first and second light paths include first and second filters adapted to pass signals of said first and second frequencies, means coupling the output of said photocell to said first and second filters, first and second phase discriminators, means coupling the output of said first filter and said voltage of said first frequency to said first phase discriminator, means coupling the output of said second filter and said voltage of said second frequency to said second phase discriminator and means responsive to the output of said first and second phase discriminators to control the movement of said first scanning head along said predetermined path.

7. An apparatus according to claim 1, wherein said first and second code means include color information associated with the location and types of operations to be performed on said work material and said first and second scanning heads include first and second means responsive to said color information of said first and second code means to control and stop respectively the movement of said member.

8. An apparatus according to claim 7, wherein the said first means responsive to said color information of said first code means includes a source of light directed towards said color information, a plurality of photocells disposed within said first scanning head, a plurality of color filters associated with said photocells and in a position to receive said light reflected by said color information and means responsive to voltage generated in said photocells to control the movement of said member.

9. An apparatus according to claim 7, wherein the said second means responsive to said color information of said second code means includes a lamp adapted to direct light towards said second code means, a plurality of photocells associated with said second scanning head, a plurality of filters associated with said photocells and in a position to receive light reflected by said second code means and means responsive to voltages generated in said photocells to stop the movement of said member.

10. An apparatus according to claim 7 wherein said first and second code means include color information associated with the location and types of operations to be performed on said work material; the said first means responsive to said color information of said first code means comprises a source of light directed towards said color information, a plurality of photocells disposed within said first scanning head, a plurality of color filters associated with said photocells and in a position to receive said light reflected by said color information, means responsive to the voltage generated in said photocells to cause said member to move; the said second means responsive to said color information of said second code means comprises a lamp adapted to direct light towards said second code means, a plurality of photocells associated with said second scanning head, a plurality of color filters associated with said photocells and in a position to receive light reflected by said second code means and means responsive to voltages generated in said photocells of said second scanning head to stop the movement of said member upon the occurrence of identity of color information of said first and second code means.

11. An apparatus for automatically controlling the operation of a machine having a movable member carrying a plurality of devices adapted to perform operations on work material disposed adjacent thereto, comprising a first code means including a template having prearranged code information thereon to determine the location and types of operations to be performed on said work material and a predetermined path interconnecting the said code information, a first scanning head, means, coupled to said first scanning head to move said first scanning head relative to the code information of said first code means and along said path, means coupled to said first scanning head to move said work material in accordance with the movement of said first scanning head, means coupled to said first scanning head and responsive to said first code means to stop the movement of said first scanning head and to control the movement of said movable member, a second code means associated with said movable member, a second scanning head adapted to scan said second code means, means coupled to said second scanning head and responsive to said second code means to stop the movement of said movable member at a predetermined location in accordance with the said code information of said first code means for said devices to perform said operations on said work material, said predetermined path contains obstacles associated with said first code means and said first scanning head further includes coupling means adapted to engage said obstacles, switch means coacting with said coupling means and means responsive to the coaction of said switch means with said coupling means to stop the movement of said first scanning head along said path when said coupling means engages any of said obstacles, means operable upon completion of the work to be performed according to the code information at the obstacle to disengage said coupling means from said obstacle and thereby start anew the movement of said first scanning head along said path.

12. An apparatus for automatically controlling the operation of a machine having first and second rotatable members adapted to receive work material therebetween; comprising a template having a first code means to determine the location and types of operations to be performed on said work material, a first scanning head, means coupled to said first scanning head to move said first scanning head relative to said template, means coupled to said first scanning head to move said work material in unison with the movement of said first scanning head, a second code means carried by said first member, a second scanning head adapted to scan said second code, means coupled to said first scanning head and responsive to said first code means to control the rotation of said members to align said members in the position determined by the information given by said first code means, means responsive to said second code means to stop the rotation of said member when said members are aligned in the said position determined by the information given by said first code means, and means coupled to said first scanning head to control the movement of said first scanning head across the surface of said template.

13. An apparatus for automatically controlling the operation of a turret punch press having a punch turret and a die turret for punching holes in substantially flat material, comprising a template to determine the location and size of holes to be punched in said material, a first code means having prearranged information to determine the locations and sizes of the holes to be punched in said material carried on the surface of said template, a first scanning head, means coupled to said first scanning head to move said first scanning head over a predetermined path across the surface of said template, means coupled to said first scanning head to carry said material in unison with the movement of said first scanning head relative to the turrets of said press, means associated with said template and said first scanning head to stop the said movement of said first scanning head at predetermined locations on said predetermined path, a second code means carried on the surface of one of said turrets, a second scanning head adapted to scan said second code means, means coupled to said first scanning head and responsive to said first code means to control the rotation of said turrets to align said turrets in the positions determined by the information given by said first code for punching operations, means responsive to said second code means to stop the rotation of said turrets at said position for said punching operations to be performed on said material, and means to resume and continue the said movement of said first scanning head along said predetermined path upon the completion of said punching operations.

14. In combination, a scanning head, a template carrying code information and a predetermined path interconnecting the code information thereof, means coupled to said scanning head to guide said scanning head along said path, means coupled to said scanning head for moving said scanning head over the area of said template in accordance with the operation of said guiding means, means responsive to said code information to control the movement of said scanning head, said guiding means for said scanning head further including a plurality of lamps adapted to direct light towards said predetermined path, the positions of said lamps providing for first and second light paths, a first pair of said lamps being located on an axis at right angles to the axis connecting a second pair of said lamps, said lamps being equidistant from the center of said scanning head, means to energize said first pair of lamps by a voltage of a first frequency 180 degrees out of phase with each other lamp, means to energize said second pair of lamps by a voltage of a second frequency 180 degrees out of phase with each other lamp, a photocell disposed on said scanning head in a position to receive light reflected from said path, first and second filters adapted to pass signals of said first and second frequencies, means coupling the output of said photocell to said first and second filters, first and second phase discriminators, means coupling the output of said first filter and said voltage of said first frequency to said first phase discriminator, means coupling the output of said second filter and said voltage of said second frequency to said second phase discriminator, to derive as the output of said first phase discriminator the phase difference over said first light path between said voltages of said lamps of said first pair and to derive as the output of said second discriminator the phase difference over said second light path between said voltages of said lamps of said second pair during the movement of said scanning head over said template and means responsive to said phase differences to control the movement of said scanning head along said predetermined path.

15. In combination, a scanning head, a template carrying code information and a predetermined path interconnecting the code information thereof, means coupled to said scanning head to guide said scanning head along said path, means coupled to said scanning head for moving said scanning head over the area of said template in accordnace with the operation of said guiding means and means responsive to said code information to control the movement of said scanning head, said predetermined path further comprising obstacles associated with said code information and said scanning head includes coupling means adapted to engage said obstacles including a pin member, a retaining spring coupled to said pin member to maintain the said pin member in engagement with said obstacles upon contact therewith, switch means coacting with said coupling means and means responsive to the coaction of said switch means with said coupling means to stop the movement of said scanning head along said path when said coupling means engages any of said obstacles, means associated with said code information at the obstacles to disengage said coupling means from said obstacle and thereby start anew the movement of said scanning head along said path.

16. In combination, a machine having a movable member carrying a plurality of devices adapted to perform operations on work material disposed adjacent thereto, code means associated with said movable member to determine the operation to be performed on said work material, means to move said member relative to said work material, a scanning head having said work material coupled thereto and adapted to scan said code means and means responsive to said code means to control the movement of said member and stop the movement of said scanning head and said member at predetermined locations in accordance with said code information for said devices to perform said operations on said work material.

17. A combination according to claim 16, wherein said code means includes color information associated with the types of operation to be performed by said machine, and said scanning head includes means responsive to said color information comprising a lamp adapted to direct light towards said code means, a plurality of photocells associated with said scanning head, a plurality of filters associated with said photocells and in a position to receive light reflected by said code means and means responsive to voltages generated in said photocells to control the movement of said member.

18. An apparatus for automatically controlling the operation of a machine having a movable member carrying a plurality of devices adapted to perform operations on work material disposed adjacent thereto, comprising a first code means including a template having prearranged code information placed thereon in an X–Y rectilinear coordinate system to determine the location and types of operations to be performed on said work material, and a predetermined path interconnecting the said code information following the X and Y coordinate lines of said rectilinear coordinate system, a first scanning head, means coupled to said first scanning head to move said first scanning head relative to the code information of said first code means and along said path of the X and Y coordinate system, means coupled to said first scanning head to move said work material in accordance with the movement of said first scanning head, means coupled to said first scanning head and responsive to said first code means to stop the movement of said first scanning head and to control the movement of said movable member, a second code means associated with said movable member, a second scanning head adapted to scan said second code means, means coupled to said second scanning head and responsive to said second code means to stop the movement of said movable member at a predetermined location in accordance with the said code information of said first code means for said devices to perform said operations on said work material.

19. An apparatus for automatically controlling the operation of a machine having a movable member carrying a plurality of devices adapted to perform operations on work material disposed adjacent thereto, comprising a first code means including a template having prearranged code information thereon to determine the location and types of operations to be performed on said work material and a predetermined path directly interconnecting the said code information, a first scanning head, means coupled to said first scanning head to move said first scanning head relative to the code information of said first code means and along said path, means coupled to said first scanning head to move said work material in accordance with the movement of said first scanning head, means coupled to said first scanning head and responsive to said first code means to stop the movement of said first scanning head and to control the movement of said movable member, a second code means associated with said movable member, a second scanning head adapted to scan said second code means, means coupled to said second scanning head and responsive to said second code means to stop the movement of said movable member at a predetermined location in accordance with the said code information of said first code means for said devices to perform said operations on said work material.

References Cited in the file of this patent

UNITED STATES PATENTS

| | | |
|---|---|---|
| 1,458,165 | Coblentz | June 12, 1923 |
| 2,172,313 | Young | Sept. 5, 1939 |
| 2,261,644 | Cockrell | Nov. 4, 1941 |
| 2,268,498 | Bryce | Dec. 30, 1941 |
| 2,363,208 | Sulzer | Nov. 21, 1944 |
| 2,611,887 | Lobosco | Sept. 23, 1952 |
| 2,701,017 | Wiedemann | Feb. 1, 1955 |
| 2,751,030 | Null | June 19, 1956 |
| 2,785,592 | Caples et al. | Mar. 19, 1957 |
| 2,820,936 | Rainey | Jan. 21, 1958 |